Sept. 22, 1936.  A. H. OELKERS  2,054,861
WHEEL AND AXLE ASSEMBLY
Filed Nov. 7, 1930  5 Sheets-Sheet 1
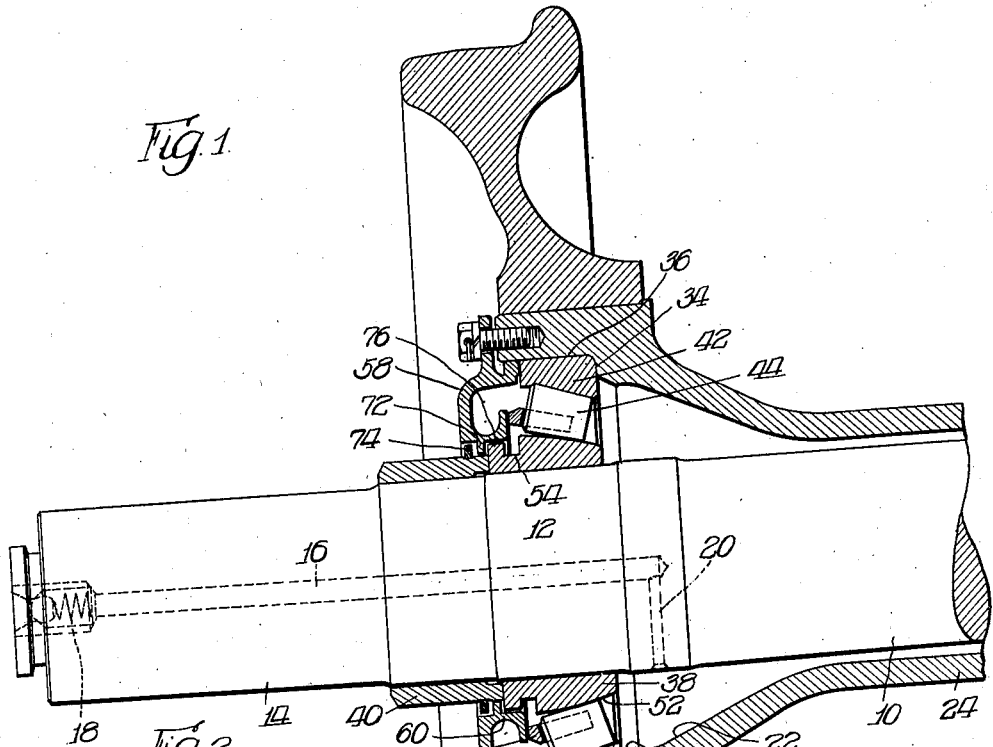
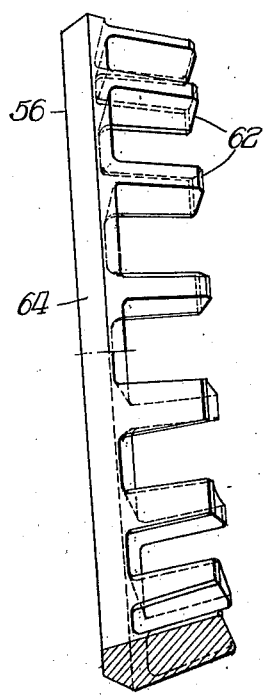
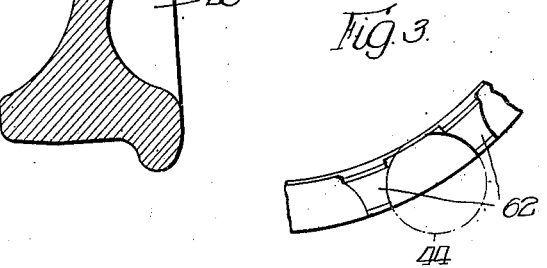
Inventor:
Alfred H. Oelkers, Sept. 22, 1936.  A. H. OELKERS  2,054,861
WHEEL AND AXLE ASSEMBLY
Filed Nov. 7, 1930   5 Sheets-Sheet 2
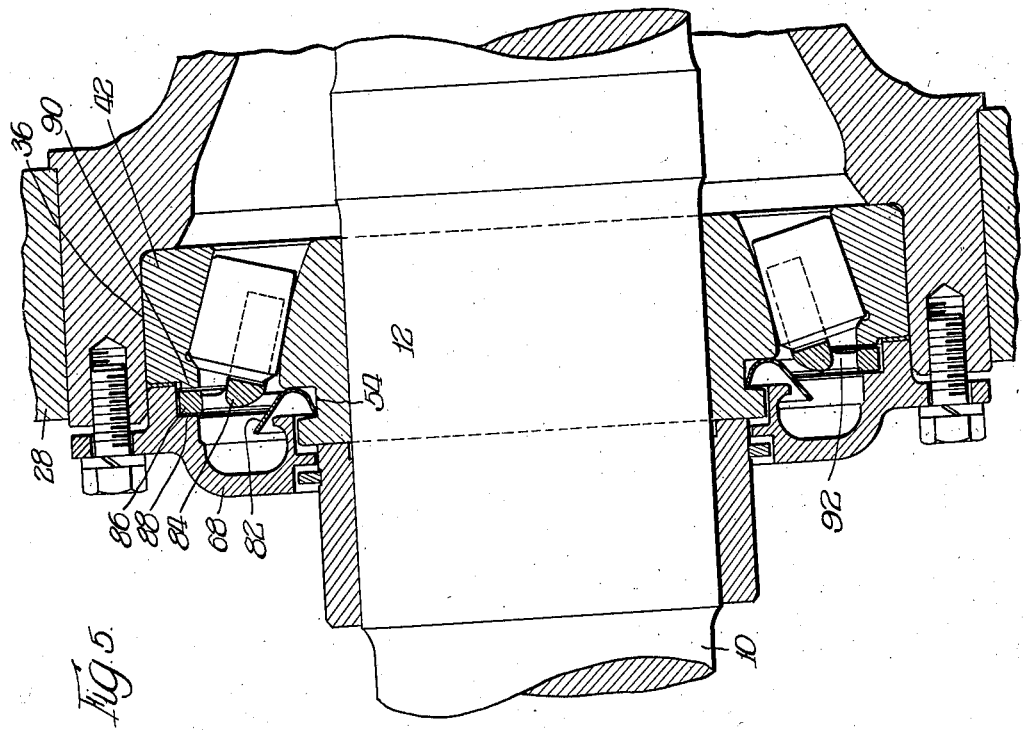
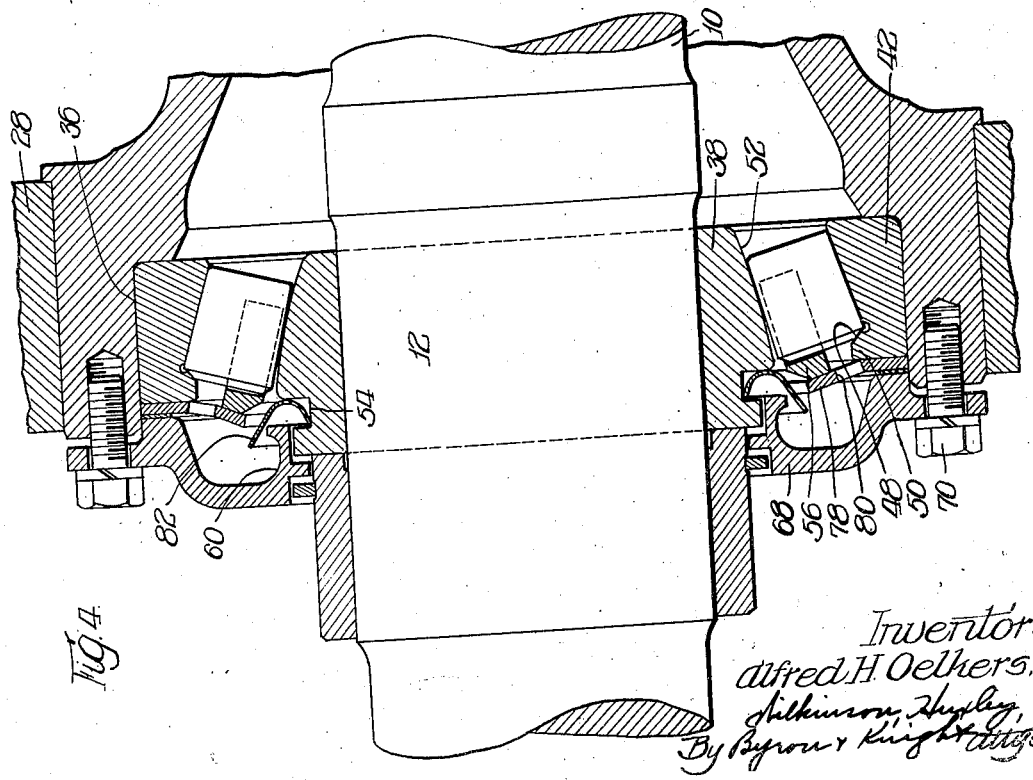
Inventor:
Alfred H. Oelkers,
By Byron & Knight
Attys Sept. 22, 1936.  A. H. OELKERS  2,054,861
WHEEL AND AXLE ASSEMBLY
Filed Nov. 7, 1930  5 Sheets-Sheet 3
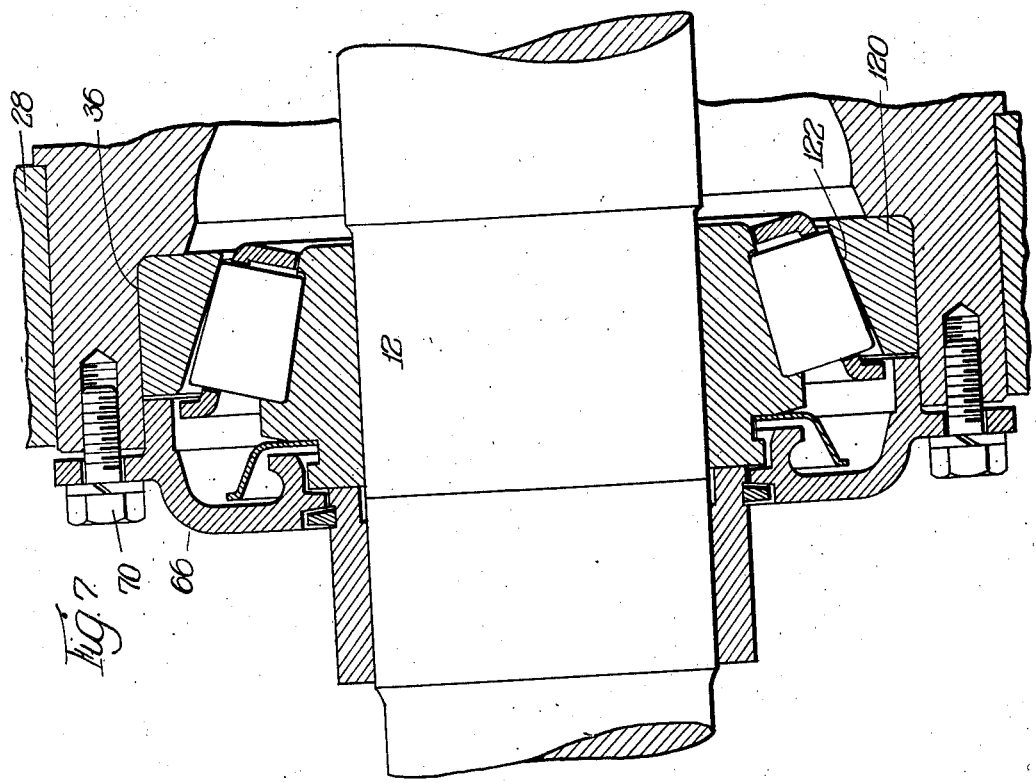
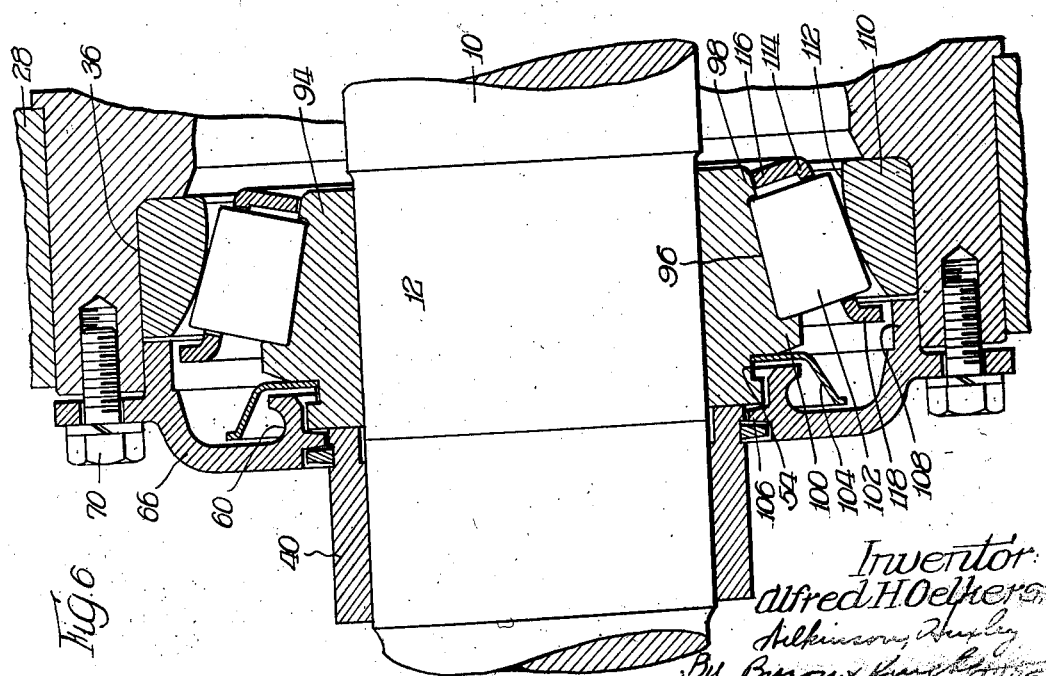
Inventor:
Alfred H. Oelkers

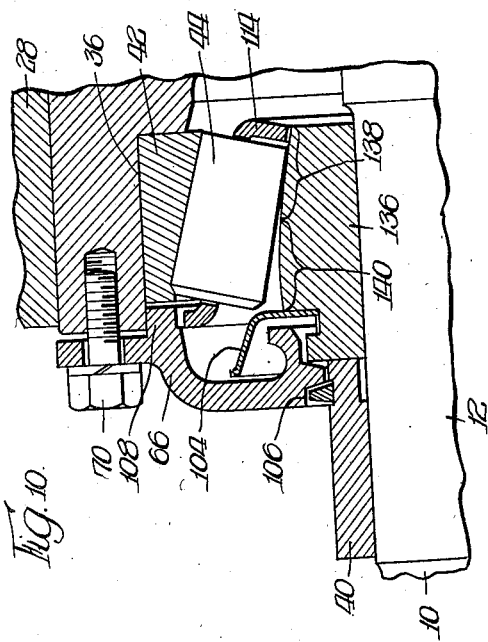

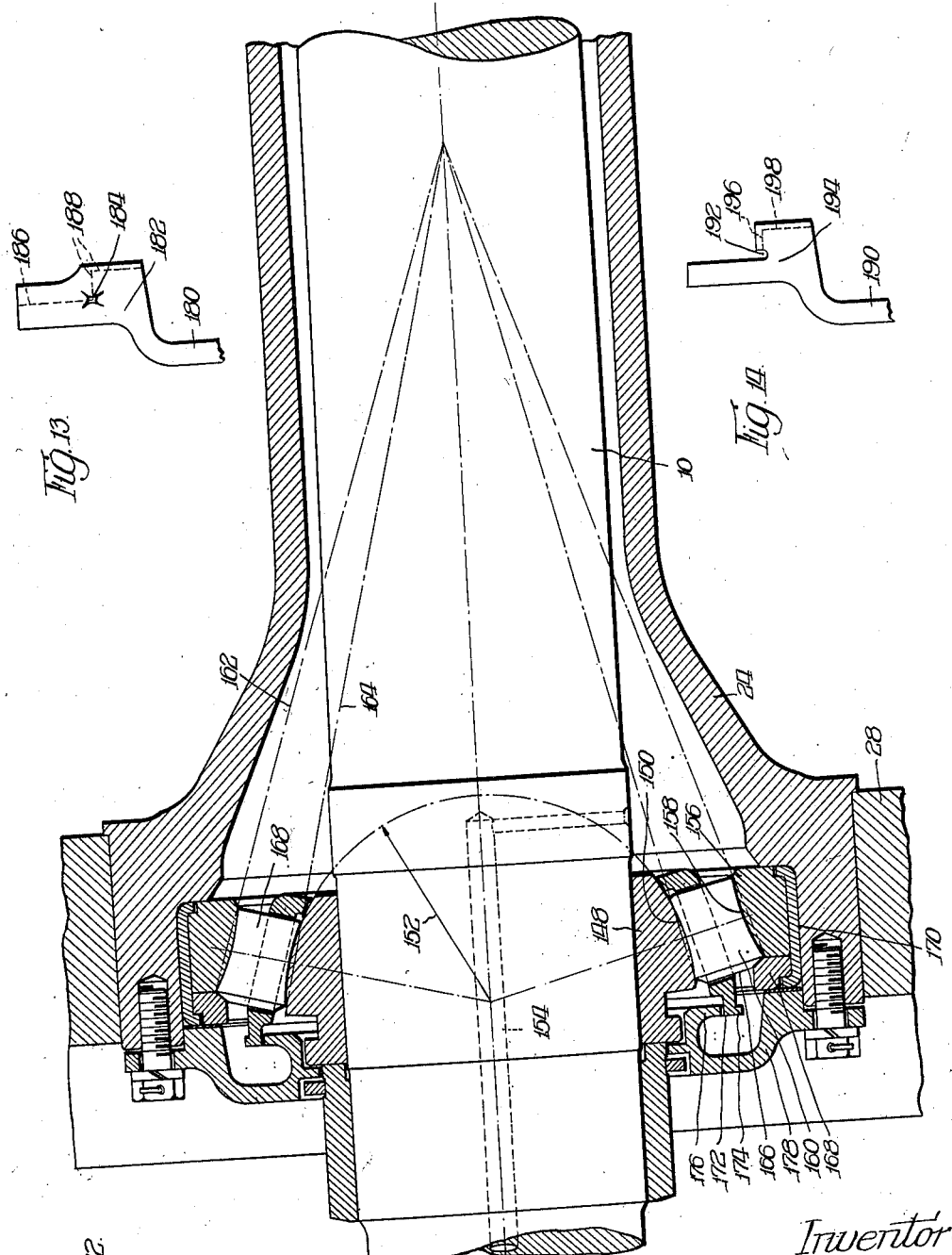

Patented Sept. 22, 1936

2,054,861

UNITED STATES PATENT OFFICE 2,054,861

WHEEL AND AXLE ASSEMBLY

Alfred H. Oelkers, Chicago, Ill., assignor to American Steel Foundries, Chicago, Ill., a corporation of New Jersey Application November 7, 1930, Serial No. 494,034

22 Claims. (Cl. 295—36)

This invention pertains to railway rolling stock and more particularly to wheel and axle assemblies embodying anti-friction bearings.

During the development of roller bearing units it was found that special details of construction were necessary for the bearings to properly function in transmitting different loads. It was also found that in order to have the bearings function properly over a long period of time the bearings must be kept clean and thoroughly lubricated, and moisture must be excluded. Grit and dirt, of course, cause wearing away of the surfaces of bearings, rendering the same inefficient. Moisture interferes with the proper lubrication of the bearings and causes or tends to cause corrosion. Some attention must also be paid to providing a bearing which can be easily and effectively assembled with the parts of the roller bearing units, and to this end it is desirable to provide a bearing which is partially self-contained.

In the operation of roller bearing railway axle assemblies it has been found that some difficulties acting to destroy the bearings are encountered. In a bearing and axle assembly such as formerly used in which the bearings are assembled with the inner race or cone of the bearing which is secured on the stationary axle, the axle deflects or bends in actual service, thereby forcing the bearing cone slightly out of alignment with the bearing cup. If then, the cage which holds the bearings against one of the bearing members and keeps the rollers spaced is mounted so as to hold the rollers in alignment with the cone, heating and damage to the bearing are experienced.

In a railway axle mounting the bearing cup or outer race revolves with the wheels. The rollers revolve around the axle and within the cup and are constantly being forced outwardly against the cup by centrifugal action with increased pressure directly dependent upon the speed. It is important to design a cage which is itself properly guided to diminish the tendency to drag whereby the individual rollers would be under heavier duty to urge the cage to rotation. Previously, the cage has been guided by the stationary race or bearing cone which tends to retard its rotation, thereby tending to prevent the rollers from being guided by the cup. The most ideal condition is for the rollers and the cage to be guided by the revolving parts of the assembly which tend to carry them along in a parallel plane with respect to the wheels, all the other parts which revolve about the axle also to have the inner, stationary axle only in contact with the surfaces of the rollers on which the radial thrust loads are carried. At the same time it is desirable that a cage be provided which will not restrict lubrication of the anti-friction bearings, but, on the contrary will aid in the lubrication thereof, especially adjacent thrust shoulders provided on a race ring of the bearings.

By experience with operating roller bearings under railway equipment, and especially where heavy loads are carried and high speeds are maintained over long periods of time, it has been found that friction between the rollers and the roller cage, as well as friction between the rollers and any part of the raceway which guides the rollers, must be kept down to a minimum to avoid the dangers of building up high temperatures and destroying the bearing.

When excessive friction is encountered on any point on the rollers under such operating conditions, the lubricant between the roller and the cage or between the roller and other guiding means on the cup or cone is frequently broken down, resulting in quick heating and damage to the roller bearing.

In certain constructions shown, the roller cage is made of bronze or other anti-friction metal in such a manner that each of the cage separators has a comparatively large bearing surface on the rollers. These separators function during the operation of the bearing by keeping the rollers separated circumferentially and serve to guide the rollers as they are brought under load. In this design of bearing application, the cup or outer raceway revolves and the rollers in the bottom portion of the cup are held rigidly between the inner and outer raceways, these rollers being the ones under load. The other rollers around the sides and upper portion of the assembly are free between the raceways and must be kept in their relative positions by the roller cage.

In this particular design of roller cage, the roller cage is constructed so that it acts purely as a separator and guide between the rollers and is particularly free from rubbing against the ends of the rollers, the roller cage at the same time being prevented from moving inwardly towards the smaller ends of the rollers.

It is therefore an object of this invention to provide a roller bearing for railway service which has conically shaped, angularly spaced rollers proportioned so that they have the least possible friction on the roller surfaces and at the same time have the inner race or cone of the bearing crowned so that it will permit the required amount of deflection of the inner axle without overloading the rollers near their ends.

Another object of this invention is to provide a roller bearing for a railway axle assembly which is particularly well adapted to inspection by merely removing the axle housing cover plate.

Still another object of this invention is to devise a practical bearing for railway use which can easily be dismantled so that each individual roller and each raceway and the cage can be handled and examined as a separate piece as a matter of periodical, complete bearing inspection. In the railway roller bearings previously used in the railway axle roller bearing units the cage has kept the rollers fixed in assembly on either the cone or cup so that complete inspection could not be made without cutting open or otherwise destroying the cage so that the rollers could be completely separated from the raceway onto which they were held by the cage. In the construction herein described the bearing may be completely dismantled by first pulling the roller bearing cone straight outward from the assembly and then pulling the roller cage outward in the same direction. Immediately after the cage is slid outward beyond the ends of the rollers it becomes completely separated from the bearing assembly and each of the rollers likewise becomes completely separated.

A still further object of this invention is to devise a complete assembly of roller bearings within the railway axle unit which is particularly easy to lubricate and which prevents loss of lubricant through the joint between the cover plate and the inner axle. When approaching a stop or when rotation is slow, the lubricant has a tendency to fall by gravity from the larger diameters where it has been evenly distributed by the action of centrifugal force, and at such time the construction I feature is of particular value in preventing loss of lubricant. This is accomplished by the combined design and action of the roller bearing cage and cover plate. It will be noted that the space between each of the rollers, as well as the space between the ends of the rollers and the cover plate, is closed by the roller cage and that the closing of these spaces in such a manner completely separates the lubricant carrying portion of the roller bearing from that portion of the bearing and cover plate which forms the mechanical seal with the parts of the inner axle. This construction has proved particularly valuable in effectively preventing the loss of lubricant during all operating conditions.

In a self-contained bearing, where a support is provided for the bearings, under certain conditions the support must be of such character that it will not interfere with the anti-friction properties of the bearings. Most all anti-friction bearings tend to be frictional under certain loadings, working or stressing of the parts of the assembly, and it is therefore an object of this invention to provide a roller bearing assembly which is inexpensive to make and maintain, and, as nearly as possible, functions as an anti-friction bearing under all conditions of operation.

A further object of the invention is to provide a roller bearing assembly wherein the race is free from any influence from non-rotating parts of the assembly, and wherein perforations in the cage in which the individual rollers are carried are set in with respect to the rollers so that each roller may be free to bear against the revolving cup whereby there is a direct tendency to carry the rollers around with the least amount of friction between the cage and rollers.

Another object of the invention is to provide an anti-friction bearing assembly wherein a part of the bearing may be assembled with a part of the axle assembly, and yet one in which the anti-friction bearing properties of the bearing are not impaired.

Yet another object of the invention is to provide a construction for a wheel and axle assembly which will positively prevent any tendency of the entrance of foreign matter to the roller bearing, and so proportioned that lubricant is prevented from being drained and is positively supplied to the bearing no matter what the condition of opertion of the bearing.

A still further object of the invention is to provide a construction which is readily applicable to existing roller bearing units, and one which is easily applied and serves to maintain the bearings in position.

With these and various other objects in view, the invention may consist of certain novel features of construction and operation, as will be more fully described and particularly pointed out in the specification, drawings and claims appended hereto.

In the drawings, which illustrate embodiments of the device and wherein like reference characters are used to designate like parts—

Figure 1 is a fragmentary sectional elevation through a wheel and axle assembly embodying one form of the invention;

Figure 2 is a fragmentary side elevation partly in section of the roller spacing member;

Figure 3 is an enlarged end elevation of the spacing member looking toward the left as viewed in Figure 2;

Figures 4 to 12 inclusive are enlarged fragmentary sectional elevations through the wheel and axle assembly embodying other forms of the invention;

Figure 13 is an enlarged fragmentary sectional elevation showing a portion of the cover plate indicating the casting and machining operation; and Figure 14 is a view corresponding to Figure 13 of a cover plate construction such as illustrated in Figure 1.

In the roller bearing constructions illustrated only certain portions of the assembly are shown and described, as it is to be understood that the constructions are duplicated at opposite ends of the assemblies.

The inner normally non-rotatable axle 10 is provided with the cylindrical bearing portion 12 and the cylindrical bearing portion 14 which is adapted to extend within the usual journal box (not shown) and cooperates with the brasses and wedges therein in a well known manner. A channel 16 disposed in the non-rotatable axle and provided with the valve fitting 18 extends inwardly of the axle to communicate with the radial channel 20 communicating with the lubricant recess 22 formed in the outer rotatable axle or casing 24. The outer rotatable axle is flared at its ends to form the lubricant recess 22 and terminates at each end in a wheel receiving portion 26, the wheel 28 being positioned thereon by means of the shoulder 30. The lubricant recess is beveled as at 32, sloping into a shoulder 34 defining the inner cylindrical bearing receiving portion 36.

In the forms of assembly illustrated in Figures 1 to 5 inclusive the inner race ring or cone 38 is pressed on the bearing receiving portion 12 of the inner axle and is maintained in operative position by means of the shrink collar 40 disposed on said inner axle 10 and engaging the cone 38. The bearing cup 42 is disposed within the portion 36 and limited by the shoulder 34 in its inward movement, and, as shown, the bearing surface of the cup on which the rollers travel is substantially of the shape of the right frustrum of a cone having the same angle as the roller.

The rollers 44 are in the shape of the frustrum of a right cone with the large end of the rollers being disposed outwardly of the assembly, the axis of the rollers sloping outwardly. The large end of each roller is provided with a smaller frusto-conical portion 46 the surface of which contacts against a complementary surface 48 provided on the thrust rib or shoulder 50, preferably formed integral with the cup. The roller of course carries the load against the bearing cup on the large conical surface, and the roller is held in position lengthwise by rolling on the bearing cup and is guided by the guiding shoulder contacting the end of the roller.

The bearing cone or inner race ring 38 on which the roller travels is nominally in the shape of a frustrum of a right cone with the exception that the elements of the surface 52 contacting the roller are slightly curved. The diameter of the cone at a point directly opposite the large end of the roller is slightly smaller than will contact the cone at this point when there is no load on the axle assembly. The diameter of the bearing cone at a point opposite the small end of the roller is likewise reduced and the deviation from a right cone presented by the surface of the roller bearing cone is made just sufficient to prevent concentrating the load between the cup surface and the roller at either end of the roller under the various loads carried by the axle. In other words, in assembling the roller bearing unit under no load, the roller bearing contacts the bearing cone at substantially mid-point between the ends of the roller, the clearance between the large end of the roller and the cone being slightly greater than the clearance between the small end of the roller and the cone.

When the assembly is loaded and the inner axle deflects, the elements taken in vertical planes through the cones and rollers tend to contact over a line rather than at a point due to the deflection of the elements of the cone and bearing. While the elements forming the bearing surface of the cone may be portions of circumferences of circles, still no two elements are formed on the same circumference. The surface of the cone, then, is such that when the axle is under its maximum bending moment and when the end of the axle is deflected downwardly the maximum amount, the end of the line of contact between the cone surface and the roller will be adjacent the large and small ends of the roller due to the tendency of the elements of the cone and bearing to straighten or coincide.

The cone is provided with the lubricant groove 54 which extends circumferentially thereof and is used to conduct lubricant from the upper portion of the assembly to the lower portion of the assembly when movement of the assembly is arrested. The roller cage 56 made of bronze or other anti-friction metal acts purely as a separator and guide between the rollers and is particularly free from rubbing against the ends of the rollers. This feature is largely accomplished by providing the cover plate 58 with a radial surface defined by the inner portion of the oil groove 60 directly opposed to the outer end of the roller cage in such position that the roller cage is prevented from moving outwardly endwise of the rollers by coming in contact with the surface of the cover plate. The roller cage at the same time is prevented from moving inwardly toward the small end of the rollers for the reason that the spacer fingers 62 of the cage are thicker at the outer end and that the body 64 of the cage will come in contact with the ends of the rollers in case of a tendency of the cage to travel in that direction.

In actual operation the cage has a slight tendency to move outwardly against the radial surface of the cover plate and because of this tendency the cover plate which is revolving at a higher speed than the cage and in the same direction as the cage acts as a driver or means for urging the revolving of the cage. This of course is a decided advantage in eliminating friction between the rollers and the cage because the manner of urging rotation of the cage by contact with such surface on the cover plate is much more efficient than such force obtained through contact with the fast revolving roller surfaces. This condition is particularly efficient with bearings assembled in railway axles herein illustrated as these axles are very heavily loaded in one direction and the urge to revolve the cage as well as support the cage in its concentric position in relation to the bearing depends entirely on the few rollers which are under load in the lower part of the assembly.

With such construction, too, the assembly is particularly adapted for inspection. A cover plate 66 is provided having inwardly extended portions 68 for positioning the cup, suitable bolts 70 serving to secure the cover plate to the outer axle. The cover plate has the radial fingers 72 adapted to fit between the baffle ring 74 disposed on the sleeve 40 and the shoulder 76 provided on the cone defining the lubricant recess 54. For inspection purposes it is only necessary to remove the cover plate and the roller bearing cage and raceways can then be seen. The bearing cage can be pulled outwardly until the inwardly sloping separator fingers engage the bearing cone. When the bearing cage is pulled outward in this manner the ends of the roller surfaces of the cage and all the surfaces on the roller raceways are easily inspected. As will be noted, the cooperative relation between the cage and the rollers and cover plate is such as to direct the lubricant away from the joint between the closure member and inner axle and to direct the same toward the anti-friction bearing and the lubricant recess 22.

In the form of assembly shown in Figure 4 the inner edge of the channel 60 is not deep enough to oppose the edge of the cage 56, and in this case the inner and downwardly extending annular plate 78 is provided secured between the cover plate 68 and the cup 42. The cage is disposed adjacent this plate and lubricant is permitted to be supplied to the bearings through elongated slots or apertures 80 provided in the plate. The plate terminates short of the baffle ring 82 disposed in the channel 54 partially overlying the channel 60 so that the tendency of the lubricant will be to flow toward the bearing, the overflow being conducted by the channels 60 and 54 to the lower part of the assembly.

In the assembly shown in Figure 5 the cage or separator 84 is provided with the upwardly extending annular ridge 86 adapted to extend between the shoulder 88 provided on the cover plate 68 and the shoulder 90 provided on the outer race ring 42. Elongated slots or apertures 92 are provided in the cage for permitting the supply of lubricant to the end of the rollers, and the outwardly extending ridge 86 serves as means for permitting the cover plate and race ring to urge the cage to rotate.

In the forms of assembly shown in Figures 6 and 7 the inner race ring or cone 94 is pressed on the bearing receiving portion 12 of the inner axle and is maintained in operative position by means of the shrink collar 40 disposed on the inner axle and engaging the cone. The anti-friction bearing receiving portion 96 of the cone slopes inwardly and is provided with the inner shoulder 98 and the outer shoulder 100 defining the bearing surface and forming thrust shoulders for the frusto-conical anti-friction bearing members or rollers 102 disposed with their larger ends outwardly. The cone is provided with the lubricant recess 54 which may be used for receiving the baffle ring 104 which overlies the channel 60 formed in the cover plate 66 secured to the outer axle by means of the bolts 70. Suitably interlocking baffle means 106 is provided between the cover plate and the shrink collar, forming an effective oil seal, and forming means for preventing entrance of foreign matter to the lubricant recess. The cover plate is provided with the inwardly extending portion 108 adapted to position the cup 110 in operative position, the cup being provided with the convexed surface 112 contacting the rollers. The bearing members or rollers are spaced apart by means of the cage 114, said cage being provided with the inwardly extending inner flange 116 disposed adjacent the inner shoulder 98 and an outer outwardly extending flange 118 disposed adjacent the inward rim flange 108 of the cover plate.

In the modification shown in Figure 7 the cup 120 is provided with a conical roller engaging surface 122 formed of straight line elements (as opposed to convexed) but the taper is greater than that of the rollers in order to provide an off-taper contact with the rollers normally contacting said rollers adjacent the inner ends when the wheel and axle assembly is unloaded so that under load a substantially full bracing contact will be provided between the load bearing rollers and the cup.

The constructions shown in Figures 8 to 11 inclusive have substantially the same essential elements as those shown in the wheel and axle units illustrated in the foregoing figures. Referring more particularly to Figure 8, the cup 42 is provided with the conical roller cooperating surface 124 contacting the rollers 44, the thrust shoulder 90 cooperating with the smaller frusto-conical portions 46. The cage 114 serves to align the rollers, though it is to be understood that a cage such as shown in Figures 1 to 5 inclusive can be used. The inner race ring 126 is provided with straight line elements 128 arranged to have an off-taper with respect to the rollers when the wheel and axle assembly is not under load so that under load deflection of the inner axle 10 causes a substantial line contact on the stress transmitting rollers.

In the construction shown in Figure 9 the cone 130 is provided with the convexed roller contacting surface 132, the curve of the roller contacting elements of the cone being tangent to an off-tapered directrix 134.

In the construction shown in Figure 10 the cone 136 is provided with elements including a straight line element 138 gradually merging into a curve line element 140, the straight line being disposed to provide an off-taper with respect to the rollers 44.

In the construction shown in Figure 11 the cone 142 is provided with the roller contacting surface wherein the elements consist essentially of a straight line element 144 merging gradually into an off-tapered element 146, the straight line being initially disposed to contact a portion of the contacting surface of the roller 44, the curve element 146 only functioning when the inner axle deflects due to axle deflection. It will of course be appreciated that any of the constructions in Figures 8 to 11 inclusive can be constructed including cage elements shown in Figures 1 to 7 inclusive, or the race parts may be reversed wherein the cups are provided with the particular configurations in which the cones will be provided with thrust shoulders as shown in Figures 6 and 7.

In the construction shown in Figure 12 a different form of self-aligning bearing and cage is contemplated. In this case the cone or inner race 148 of the anti-friction bearing has a spherical surface 150 on which the rollers operate, said surface having a radius 152 the center of which is on the axis 154 of the assembly. The cup or outer race 156 has the surface 158 of convex shape so that the rollers 160 fit between and operate with said races. The rollers are not symmetrical in shape, but are made smaller at the inner ends thereof than at the outer ends, and the bearing elements of the individual rollers are elements of a sphere.

The rollers are proportioned, however, so that lines 162 and 164 drawn to span the diameter of the roller at the outer end and the inner end converge at a point on the axis 154. This roller proportion is such that the inner and outer ends of the rollers are in the forms of bases of the frustum of a right circular cone having its vertex on the axis 154. By this roller proportion a substantially true path of rolling around the cone 148 is obtained, materially reducing the amount of slippage of surfaces between the rollers 160 and the cone 148.

The outer ends of the rollers are provided with a frusto-conical surface 166 which operates against an opposing ridge or flange 168, formed either independently of the outer race or integrally with the outer race or cup. When the flange 168 is formed by a separate member, this member and the cup are preferably interlocked in an assembly by means of the sleeve 170 which fits over and is flanged or crimped at both ends to hold the pieces together. The conical surface 166 holds the rollers in position so that they cannot move endwise outward from between the running surfaces, that is, it opposes the tendency of the rollers to move outward from between the races.

The roller cage 172 is guided on the inner end by a flange disposed in close proximity to the surface of the cone and the outer end has an extension 174 which fits closely over the flange 176 formed on the cover plate 178, the extension 172 and the flange 176 forming a lubricant conducting portion. The close proximity of the roller cage to the cone surface on the inner end and to the flange 176 on the cover plate causes it to be guided by these two members when the bearing is in rotation, thereby keeping it concentric with the bearing assembly. The friction between the surfaces of the rollers and the bridges of the cage is, however, relieved by the fact that the bearing housing cover plate revolves and the contacting surface of the flange 176 has a tendency to urge the cage along with it.

The roller cage has a series of pockets into which the various rollers of the assembly fit, the pockets being formed by suitable bridges by which the rollers are prevented from coming in contact with each other, and in this construction there is little or no effort required for the rollers to hold the cage concentrically with the bearing.

Referring now to Figure 13, a form of cover plate is shown in which the web of the cover plate 180 and the fastening flange and race positioning flange are cast as shown in full lines. In casting, on account of the thickness of metal disposed adjacent 182 there is danger of uneven cooling which will cause a blow hole or crack to appear as at 184. With this shape of cover plate it is necessary to machine along the dotted lines 186 and 188, and if the cooling has not taken place properly, it will be seen that there is danger that the casting will be weakened to such an extent that it may be necessary to discard it.

However, with the form of cover plate shown in Figure 14, the cover plate 190 is cast in the configuration shown, the adaptation of this being illustrated in Figure 1, and it will be noticed that the mass of metal as at 182 is relieved as at 192 wherein there is a comparatively small mass of metal disposed at 194, permitting proper cooling. With this construction, then, it is necessary only to machine along the lines as shown at 196 and 198, and due to the disposition of the metal the thickness of the casting being substantially constant, there is practically no danger of blow holes or cracks appearing, thus making a cheaper construction from a standpoint of less waste as well as a standpoint of less machining and handling.

It is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

I claim:

1. In a railway wheel and axle assembly, the combination of an outer rotary axle having an enlarged wheel hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink ring mounted on said inner axle for positioning said anti-friction bearings, a cover plate mounted on said outer axle and extending toward said shrink ring, said shrink ring having means thereon cooperating with a portion of said cover plate whereby foreign matter is excluded from said anti-friction bearings, and means embracing a portion of said bearings for spacing said bearings.

2. In a railway wheel and axle assembly, the combination of an outer rotary axle having an enlarged wheel hub portion and a bearing recess, said axle having a lubricant recess communicating with said bearing recess and partially within said enlarged hub portion, an inner substantially non-rotatable axle extending through said outer axle and having a bearing portion thereon, anti-friction bearings mounted between said axles and in said bearing recess, a shrink ring mounted on said inner axle for positioning said anti-friction bearings, a cover plate mounted on said outer axle and extending toward said shrink ring, said shrink ring having means thereon cooperating with a portion of said cover plate whereby foreign matter is excluded from said anti-friction bearings, and a cage having fingers embracing a portion of said bearings for spacing said bearings.

3. In a wheel and axle assembly, the combination of a revoluble axle, a normally substantially stationary axle, anti-friction bearings disposed between said axles, said bearings including anti-friction members, a closure member between said axles provided with a lubricant cavity, and a cage for spacing said anti-friction members, said member being engaged by said cage whereby the same is rotated thereby.

4. In a wheel and axle assembly, the combination of a revoluble axle, a normally substantially stationary axle, anti-friction bearings disposed between said axles, said bearings including anti-friction members, a cage for spacing said anti-friction members, and a cover plate secured to said revoluble axle and extending toward said stationary axle, said plate having an inwardly disposed portion defining a lubricant cavity, said cage being adapted to be rotated by said portion.

5. In a wheel and axle assembly, the combination of a revoluble axle, a normally substantially stationary axle, anti-friction bearings disposed between said axles, said bearings including anti-friction members, a cup and cone, said cone being convexed, said cup having an anti-friction member engaging portion, and a cage for spacing said anti-friction members, said cage being adapted to be rotated by said revoluble axle.

6. In a wheel and axle assembly, the combination of a revoluble axle, a normally substantially stationary axle, anti-friction bearings disposed between said axles, said bearings including anti-friction members and cooperating racerings, said members and at least one of said racerings having cooperating bearing surfaces to accommodate relative angular movement of said axles, a cage for spacing said anti-friction members, and a member interposed between one of said axles and said cage and having peripheral engagement with said cage for rotating the same irrespective of said relative angular movement of said axles.

7. In a wheel and axle assembly, the combination of a revoluble axle, a normally substantially stationary axle, anti-friction bearings disposed between said axles, said bearings including anti-friction members and cooperating racerings, said members and at least one of said racerings having cooperating bearing surfaces to accommodate relative angular movement of said axles, a cage for spacing said anti-friction members, and a member interposed between said revoluble axle and said cage and having peripheral engagement with said cage for rotating the same irrespective of said relative angular movement of said axles.

8. In a wheel and axle assembly, the combination of a revoluble axle, a normally substantially stationary axle, anti-friction bearings disposed between said axles, said bearings including anti-friction members, a cup and a cone, a cage for spacing said anti-friction members, a member interposed between said revoluble axle and said cage for rotating said cage, and a member carried by said cone for directing lubricant toward said bearings.

9. In a wheel and axle assembly, the combination of a revoluble axle, a normally substantially stationary axle, anti-friction bearings disposed between said axles, said bearings including anti-friction members, a cup and cone, said cone having an anti-friction member engaging portion, said cup having an off-taper, and a cage for spacing said anti-friction members, said cage being adapted to be rotated by said revoluble axle.

10. In a wheel and axle assembly, the combination of a revoluble axle, a normally substantially stationary axle, anti-friction bearings disposed between said axles, said bearings including anti-friction members, a cup and cone, said cup having an anti-friction member engaging portion, said cup having an off-taper, and a cage for spacing said anti-friction members, said cage being adapted to be rotated by said revoluble axle.

11. In a wheel and axle assembly, the combination of an inner and outer axle, one of said axles being normally stationary and the other normally rotatable relative thereto, anti-friction bearing assemblies between said axles, said assemblies each including a cage, and a closure member between said axles, said closure member having an inwardly disposed portion defining a lubricant cavity engageable by said cage.

12. In a wheel and axle assembly, the combination of an inner and an outer axle, one of said axles being rotatable, anti-friction bearing assemblies between said axles, said assemblies each including a cage, and a closure member secured to said rotatable axle and extending between said axles, said closure member having a portion extending axially and radially defining a lubricant cavity engageable by said cage whereby the same is rotated upon rotation of said rotatable axle and closure member.

13. In a wheel and axle assembly, the combination of an inner and outer axle, one of said axles being normally stationary and the other normally rotatable relative thereto, anti-friction bearing assemblies between said axles, said assemblies each including a cage, and a closure member between said axles, said closure member having an inwardly disposed flange engageable with said cage for positioning the same.

14. In a wheel and axle assembly, the combination of an inner and outer axle, one of said axles being normally stationary and the other normally rotatable relative thereto, anti-friction bearing assemblies between said axles, said assemblies each including a cage, and a closure member between said axles, said closure member having an inwardly disposed flange provided with a portion defining a lubricant cavity engageable with said cage for positioning the same.

15. In a wheel and axle assembly, the combination of an inner and outer axle, one of said axles being normally stationary and the other normally rotatable relative thereto, anti-friction bearing assemblies between said axles, said assemblies each including a cage, and a closure member between said axles, said closure member comprising an outer web and a portion spaced therefrom engageable with said cage for positioning the same.

16. In a wheel and axle assembly, the combination of an inner and outer axle, one of said axles being normally stationary and the other normally rotatable relative thereto, anti-friction bearing assemblies between said axles, said assemblies each including anti-friction members, cooperating races associated with said inner and outer axles, a closure member disposed between said axles and rotated by said rotatable axle and provided with a lubricant cavity, means carried by one of said races and extending into said cavity for directing lubricant toward said anti-friction members, and a cage for said anti-friction members cooperating with the rotating part of said assembly whereby said cage is rotated thereby.

17. In a wheel and axle assembly, the combination of an inner and outer axle, one of said axles being normally stationary and the other normally rotatable relative thereto, anti-friction bearing assemblies between said axles, said assemblies each including anti-friction members, cooperating races associated with said inner and outer axles, a closure member between said inner and outer axles provided with an inwardly disposed flange, and means carried by one of said races and extending over said flange for directing lubricant toward said anti-friction members.

18. In a wheel and axle assembly, the combination of an inner and an outer axle, one of said axles being normally stationary and the other normally rotatable relative thereto, anti-friction bearings including a single course of tapered rollers disposed between said axles, a closure member disposed between said axles, and a cage having a ring disposed to cooperate with said closure member and the larger ends of said rollers and having spaced fingers projecting between and embracing said rollers for guiding the same, said fingers conforming to the contour of said rollers thereby tending to prevent movement of said ring into contact with said rollers.

19. In a wheel and axle assembly, the combination of an inner and an outer axle, one of said axles being normally stationary and the other normally rotatable relative thereto, anti-friction bearings including a single course of tapered rollers disposed between said axles, a closure member disposed between said axles, and a cage having a ring disposed to cooperate with said closure member and the larger ends of said rollers and having spaced fingers projecting between and embracing said rollers for guiding the same, said fingers being thicker at the outer ends thereof thereby tending to prevent movement of said ring into contact with said rollers.

20. In a wheel and axle assembly, the combination of an inner and an outer axle, one of said axles being normally stationary and the other normally rotatable relative thereto, anti-friction bearings including a single course of rollers disbearings including a single course of rollers disposed between said axles, a closure member disposed between said axles, lubricant chambers disposed between said axles inwardly and outwardly of said bearings, said closure being secured to one of said axles and having means cooperating with means on the other of said axles providing a substantially fluid-tight joint but permitting relative movement therebetween, said inner lubricant chamber being formed in part by the main body portion of said closure member and in part by a portion disposed in spaced relation thereto, and a cage for said rollers cooperating with said last-named portion to provide a substantia seal therebetween whereby lubricant from said outer lubricant chamber is directed away from said joint.

21. In a wheel and axle assembly, the combination of an inner and an outer axle, one of said axles being normally stationary and the other normally rotatable relative thereto, anti-friction bearings including a single course of rollers disposed between said axles, a closure member disposed between said axles, lubricant chambers disposed between said axles inwardly and outwardly of said bearings, said closure being secured to one of said axles and having means cooperating with means on the other of said axles providing a substantially fluid-tight joint but permitting relative movement therebetween, said inner lubricant chamber being formed in part by the main body portion of said closure member and in part by a portion disposed in spaced relation thereto, and a cage for said rollers, said cage having openings conforming to the contour of said rollers and cooperating with said last-named portion to provide a substantial seal whereby lubricant from said outer lubricant chamber is directed away from said joint and toward said inner lubricant chamber.

22. In a wheel and axle assembly, the combination of an inner and an outer axle, one of said axles being normally stationary and the other normally rotatable relative thereto, anti-friction bearing assemblies between said axles, said assemblies each including anti-friction members, cooperating races associated with said inner and outer axles, a closure member disposed between said axles and having an inwardly extending part providing a lubricant cavity, a deflector carried by one of said axles extending over said part and into said cavity for directing lubricant toward said anti-friction members, and a cage for said anti-friction members cooperating with the rotating part of said assembly whereby said cage is rotated thereby.

ALFRED H. OELKERS.